P. SOURS.
COFFEE-POT.
No. 176,249.    Patented April 18, 1876.
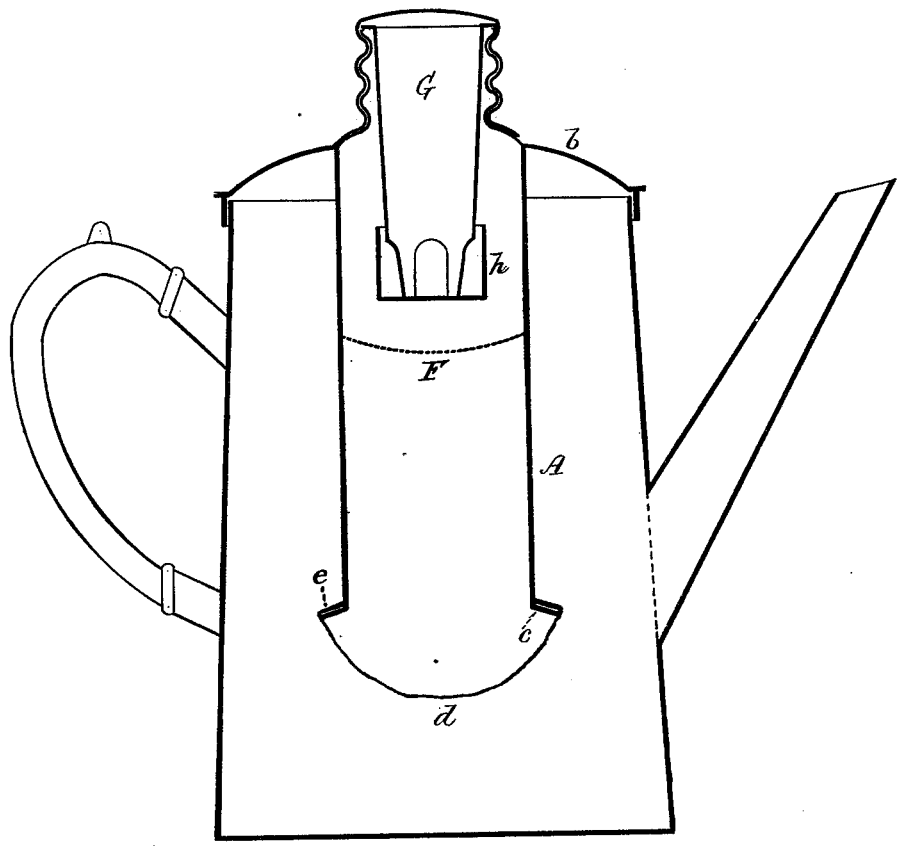
WITNESSES
Nat E. Oliphant
Geo. D. Renneker
INVENTOR.
Peter Sours,
per Charles H. Fowler
Atty.

UNITED STATES PATENT OFFICE.

PETER SOURS, OF METUCHEN, NEW JERSEY.

IMPROVEMENT IN COFFEE-POTS.

Specification forming part of Letters Patent No. 176,249, dated April 18, 1876; application filed April 9, 1875.

*To all whom it may concern:*

Be it known that I, PETER SOURS, of Metuchen, Middlesex county, and State of New Jersey, have invented Improvements in Coffee-Pots, of which the following is a specification:

The object of my invention is to make an improved infusion or decoction of coffee by the use of the several devices illustrated in detail by the accompanying model and drawing in vertical section, and submitted as a part of this specification.

A is a hollow cylinder or biggin, soldered or otherwise attached to the cover $b$, and has at its lower extremity a projecting flange, forming a ledge, $c$, for the support of a removable suspended filter, $d$, of flannel or other suitable material, said filter being held in position for use by means of an elastic band, $e$, or its equivalent. F is a perforated disk acting as a water-distributor. This perforated disk F may be either composed of a perforated plate of sheet metal or formed of wire-gauze, as may be desired. G is a removable conical tube, to the lower end of which is fastened a cup, $h$, the two acting jointly as a conduit for the passage of water into the pot, and as a hydraulic seal or trap against the escape of ascending vapor and aroma. That portion of said hollow cylinder or biggin between the perforated disk and its lower end when in an inverted position forms a receptacle or charger for the coffee before infiltration and leaching.

I claim as my invention—

The cover $b$, biggin or cylinder A, perforated disk F, and annular flange $c$, over which to secure the filter $d$, in combination with the conical tube G and cup $h$, substantially as and for the purpose specified.

PETER SOURS.

Witnesses:
 GILBERT GEDNEY,
 WILLIAM A. LANE.